(12) United States Patent
Robinson et al.

(10) Patent No.: US 7,014,036 B2
(45) Date of Patent: Mar. 21, 2006

(54) CATHODE LINEAR CONVEYER ASSEMBLY

(75) Inventors: Victor Robinson, Port Sydney (CA);
Ronald Vandenburg, Oakville (CA);
Philip Donaldson, Porcupine (CA)

(73) Assignee: Falconbridge Limited, Sudbury (CA)

( * ) Notice: Subject to any disclaimer, the term of this patent is extended or adjusted under 35 U.S.C. 154(b) by 0 days.

(21) Appl. No.: 10/306,823

(22) Filed: Nov. 27, 2002

(65) Prior Publication Data

US 2004/0099505 A1   May 27, 2004

(51) Int. Cl.
B65G 17/20 (2006.01)
(52) U.S. Cl. ................ 198/678.1; 198/465.1; 134/72
(58) Field of Classification Search .......... 198/678.1, 198/465.1; 204/202, 203; 445/46, 49; 134/64 R, 134/75, 70–73, 124, 125
See application file for complete search history.

(56) References Cited

U.S. PATENT DOCUMENTS

| | | | |
|---|---|---|---|
| 2,821,491 A | 1/1958 | Fleming et al. | 134/6 |
| 3,472,249 A * | 10/1969 | Jasberg | 134/46 |
| 3,533,887 A * | 10/1970 | Jasberg | 134/46 |
| 3,562,131 A * | 2/1971 | Jasberg | 204/198 |
| 3,636,677 A | 1/1972 | McNamara et al. | 53/3 |
| 3,883,403 A | 5/1975 | Ettel et al. | 204/12 |
| 4,144,817 A | 3/1979 | Morita | 104/108 |
| 4,401,522 A | 8/1983 | Buschow et al. | 204/15 |
| 4,427,019 A * | 1/1984 | Eidschun | 134/72 |
| 4,539,069 A * | 9/1985 | Fishman et al. | 134/72 |
| 4,840,710 A | 6/1989 | Middlin et al. | 204/12 |
| 5,149,410 A | 9/1992 | Robinson et al. | 204/199 |
| 5,688,159 A * | 11/1997 | Kusano et al. | 451/1 |
| 6,202,830 B1 | 3/2001 | Bohlin et al. | 198/465.4 |
| 6,341,686 B1 * | 1/2002 | Beyer | 198/678.1 |

FOREIGN PATENT DOCUMENTS

| | | |
|---|---|---|
| DE | 1 076 568 | 2/1960 |
| DE | 23 47 459 | 4/1975 |
| EP | 0 656 304 | 6/1995 |
| WO | WO 97/24475 | 7/1997 |
| WO | WO 00/18988 | 4/2000 |
| WO | WO 00/77276 | 12/2000 |

* cited by examiner

*Primary Examiner*—James R. Bidwell
(74) *Attorney, Agent, or Firm*—Fulbright & Jaworski, LLP

(57) ABSTRACT

The present invention provides a linear conveyer assembly for cathode plates comprising a continuous timing belt provided with cathode plate conveying assemblies attached thereto and having cam rollers running in a pair of channels running along either side of and parallel to a forward path of the belt. The conveying assemblies insure that the cathode plate conveying assemblies are aligned in an overhead position in such a way that the cathode plates move in a direction substantially perpendicular to a surface thereof. The timing belt is fabricated from a corrosive resistant material and allows an accurate positioning of the cathode plates due to a non-permanent stretch character thereof.

18 Claims, 3 Drawing Sheets

CATHODE LINEAR CONVEYER ASSEMBLY

FIELD OF THE INVENTION

The present invention relates to metal electro-winning or electro-refining. More specifically, the present invention is concerned with a linear conveyor assembly for transferring electrode plates on which a refined metal has been deposited between a number of stations that can include hammering, flexing, stripping and others.

BACKGROUND OF THE INVENTION

As is well known in the art, electro-winning refers to the technique of extracting a metal from its soluble salt by an electrolytic cell. It is used in recovery of zinc, cobalt, chromium, and manganese, and has recently been applied to copper when in the form of a silicate ore. For any specific metal, the salt in solution is subjected to electrolysis and is electro-deposited on a cathode starter plate. In particular, electro-winning techniques used to produce pure metallic copper from leach/solvent electrolytes consist of applying an electrical potential between inert lead alloy anodes and stainless steel or copper cathodes immersed in a $CuSO_4$—$H_2SO_4$—$H_2O$ electrolyte. Copper metal is deposited at the cathode and oxygen gas released at the anode. Purity of the refined copper can be maximized by, amongst other factors, providing for straight cathodes fabricated from stainless steel arranged vertically in the electrolytic bath and positioned at uniform distances.

Similarly, electro-refining refers to a technique for purifying metals by electrolysis using an impure metal as anode from which the pure metal is dissolved and subsequently deposited at the cathode. In particular, when electro-refining copper, copper is dissolved from impure copper anodes into a $CuSO_4$—$H_2SO_4$—$H_2O$ electrolyte. Pure copper without the anode impurities is plated onto the cathodes. Copper refined in this manner is of very high purity, typically with less than 20 ppm impurities plus oxygen which is controlled at about 0.025%.

When using cathode starter plates which are manufactured from the same metal as that being refined, once deposited the entire plate can be melted with a portion of the molten refined metal being retained to fabricate new starter plates. When another metal, such as stainless steel, is used to fabricate the starter plate the refined metal deposited on the starter plate must be subsequently removed. Over the years, the electrolytic refining/electro-winning industry has developed a variety of equipment for the mechanized removal of metals deposited on starter plates as a result of the refining process. Currently, two major advanced technologies in the field of permanent cathode technology are used to supply the copper industry. These are Falconbridge's "Kidd Process Technology" and the "ISA Technology 2000 Process" marketed by M.I.M. Technologies (Mount ISA Mines of Australia.) for example.

In order to strip a starter plate covered with refined metal the plate must typically be moved between a number of stations for washing, stripping, refinishing, etc. One problem with moving the plate is the weight of the deposited metal which can be in excess of 300 kg., thereby requiring a robust and rugged structure for moving the plates.

The Falconbridge Kidd Process, which was first developed for the Kidd Creek Refinery in Timmins in 1985, uses a rotary, top driven carousel with cathode plates conveyed through multiple stripping stations. The cathode plates are suspended by hanger bars from supports mounted to the carousel base. One original Kidd patent included such a top driven carousel.

In the Kidd Process, copper deposited on the starter plate is normally stripped in plates (one deposited on each side of the starter plate) joined along a bottom edge. As will be seen below, however, cathode starter plates fabricated from stainless steel typically incorporate a well known "V" groove along the bottom edge which allows the deposited copper plates to be readily separated from one another during stripping. Stripped joined copper plates thereafter drop at least their full length to be removed and are subsequently stacked in bundles.

The ISA Process, which was first developed by Mount ISA Mines for their Townsville Refinery, Queensland, Australia in 1972, utilizes a linear conveyer system, wherein the cathodes are conveyed, supported on a bottom edge, by a narrow pan-type conveyor, through multiple stripping stations. The cathodes are kept vertical by stainless steel round (pipe/tube) guide rails. Initially, the bottom edge of mother blanks were dipped in wax to prevent copper growth around the bottom edge. The copper can then be stripped as two separate halves, unlike the bottom joined plates in the Falconbridge Kidd Process. In the late 90's the technology was upgraded by introducing a "V" notch cathode to eliminate the wax, which acts as an. Impurity, from the process. Additionally, the stripping equipment was redesigned to take advantage of the plane of weakness in the plated copper at the lower edge "V" notch, such that the plates are gripped and rotated from the mother blank to break the bottom joint, thus yielding separate plates.

A number of features are now well mastered in the art, such as moving a cathode plate between stations; moving a cathode plate transversely between stations (i.e. in a direction which is perpendicular to the surface of the cathode plate); suspending a plate from above for transverse movement on a conveyor between stations; using a hook assembly, comprised of a pair of hooks inserted through a pair of rectangular slots, for raising and moving a cathode plate laterally.

Still, many recurrent problems are faced. Indeed, since stripping systems in electrolytic plants process thousands of electrodes daily, a continual effort is being made to increase their reliability and ease of maintenance. Conventionally, electrodes are transferred by a multitude of chain or walking beam-type conveyor designs, which incorporate chain on the conveyor, or structural members linked together and positioned with hydraulic cylinders as a walking beam for conveyance. However, the fluids used in the electrolytic refining process are highly corrosive and therefore it has proven necessary with such prior art designs to use expensive chain made of stainless steel. The heavy weight of the deposited metal combined with the stop and start of the conveyors as they move plates between stations leads to permanent chain stretch and results in positioning problems requiring regular adjustments. Similarly, the corrosive electrolyte accelerates wear of the pins and bushings of conveyors located below the electrodes which is further accelerated as the conveying speed increases.

The rotary carousel type conveying apparatus, such as the one utilized In the Kidd Process Systems mentioned hereinabove, alleviates the positioning problems at the stations as the electrodes supports are rigidly attached to a rotating base unit. However the high mass with great inertia of the structure requires a heavy duty drive unit with its associated high capital cost. Additionally, the rotary carousel is a relatively complex device which has proven difficult to competitively adapt in simpler implementations.

Relatively recent (in the years 2000 and 1997) applications by Outokumpu Oyj (WO 00/77276 and WO 00/18988) and Outokumpu Wenmec Systems (WO 97/24475), for example, address these difficulties by utilizing complicated arrangements of linked structural elements.

It remains that, for higher capacity stripping systems, rapid and reliable transfer of the vertically positioned electrodes between the stripping (working) stations is of paramount importance.

Clearly, there is still a need in the art for an improved high speed linear conveyor system to position plated cathodes in adjacent stations of automated stripping systems in refining/electro-winning plants, such as copper refining/electro-winning plants for example.

SUMMARY OF THE INVENTION

The present invention discloses a linear conveyer assembly for transporting cathode plates. The conveyor comprises continuous timing belt having a surface substantially parallel to the ground, a series of cathode plate conveying assemblies attached at intervals to the belt and extending downwards and a motor for driving sale timing belt. The series of cathode plate conveying assemblies are supported such that a travel thereof is limited to a direction parallel with said surface of the timing belt. The timing belt is located above the cathode plates being transported.

In particular, each one of the series of conveying assemblies comprises a roller support bracket supported by a support plate, roller track guides, cam rollers attached to a cathode hanger bar and a cathode hanger bracket directly supporting said cathode plate transferred through the cam rollers to a running surface provided by said roller support bracket.

Also disclosed is a linear conveyer assembly for cathode plates. The conveyor comprises a continuous timing belt provided with at least one cathode plate conveying assembly attached thereto and cam rollers attached to the cathode plate conveying assembly and running in a pair of channels disposed along either side of and parallel to a forward path of the belt. The cathode plate conveying assembly is aligned in an overhead position so that the cathode plates move in a direction substantially parallel to a surface thereof. The timing belt is fabricated from a corrosive resistant material and allows for accurate positioning of the cathode plates due to a non-permanent stretch character thereof.

Other objects, advantages and features of the present invention will become more apparent upon reading of the following non-restrictive description of specific embodiments thereof, given by way of example only with reference to the accompanying drawings.

DESCRIPTION OF SPECIFIC EMBODIMENTS

The present invention provides a linear conveyer assembly for use in an electro-refining or electro-winning facility for conveying electrode plates, typically cathode plates, between work stations, wherein at each station a different operation is carried out, for example loading, stripping, washing, refinishing and unloading a cathode plate. There may be a number of stations in a given implementation.

More precisely, the present invention provides an assembly and a method to convey electrodes from one work station to another, with the electrodes being conveyed in line or in parallel to a line of hangers supporting an extremity of the electrodes, and a non permanent stretch positive gear toothed timing belt with accurate positioning drive being utilized in order to convey and position the electrodes reliably at high speed.

Figure 1:
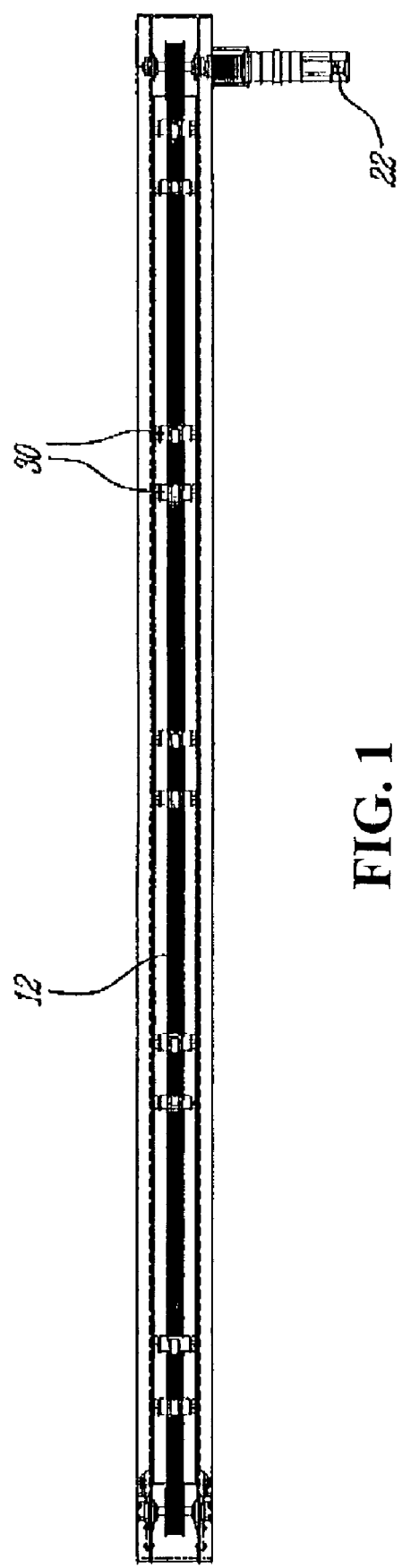
FIG. 1 is a general side view of an assembly according to an embodiment of the present invention.

As illustrated in FIG. 1, a conveyor assembly for use in an electro-refining facility according to an aspect of the present invention generally comprises a continuous timing belt 12 which surface is substantially parallel to the ground (not shown); a series of cathode plate conveying assemblies 30 attached to an outside surface of the belt 12; and a driving assembly 22 for driving the belt 12.

In a specific embodiment the timing belt 12 is fabricated from extruded lengths of polyurethane and may also be laminated with other materials such as steel, kevlar, carbon or glass fibre for reinforcing. Additionally, the timing belt may be backed with other materials such as nylon to lower friction. Polyurethane is well known in the art as a material for fabricating drive belts and the like and is advantageous in many implementations given the combination of its high tensile strength, low mass, suppleness and the ability to fabricate continuous drive belts of virtually any length and thickness. Additionally, timing belts from polyurethane have a wide working temperature range, are extremely resistant to many chemicals and have good resistance against both acids and alkalis.

The timing belt 12 has a generally smooth outer surface and a notched or toothed inner surface (not shown). In this specific embodiment the timing belt is fabricated from stock having a standard AT20 pitch, a width of 100 mm and a length of approximately twenty (20) metres.

Figure 2:
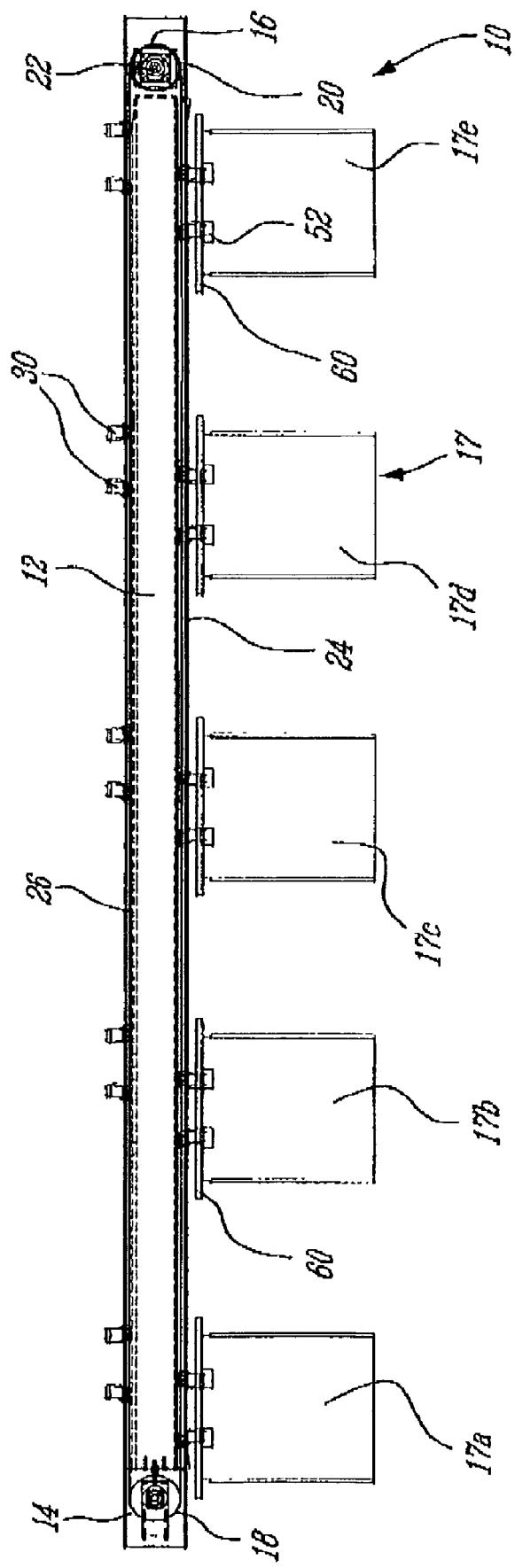
FIG. 2 is a side view of the assembly of FIG. 1 showing support hooks.

Turning now to FIG. 2 of the appended drawings, a specific assembly 10 according to an embodiment of this first aspect of the present invention will be described in more detail.

Figure 3:
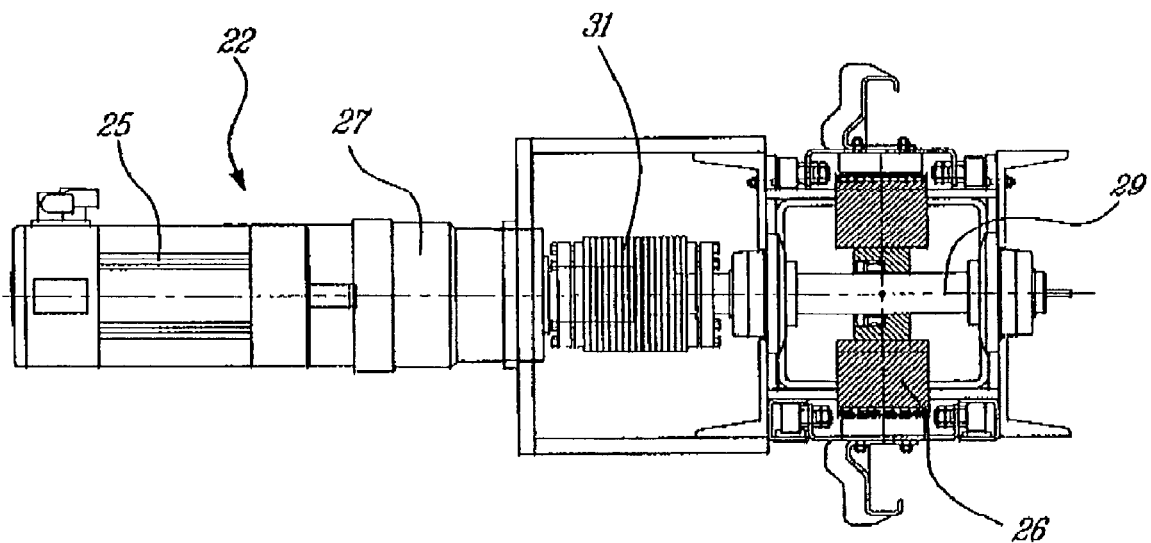
FIG. 3 is a detail view of the motor assembly of the assembly of FIG. 1.

The assembly 10 comprises a continuous timing belt 12, which is looped at either end thereof 14 and 16 over a pair of cogs 18, 20 respectively, one of which (here the drive cog 20) being attached to a driving assembly 22 for driving the belt 12, as can be best seen in FIG. 3. The drive cog 20 is typically manufactured from a light metal such as aluminum although in corrosive environments stainless steel may in some cases be advantageous.

Referring to FIG. 3, the driving assembly 22 comprises a motor 25, which may be a brushless servo drive motor, for example. In a specific embodiment of the present invention the servo drive motor 25 is a very low inertia device consisting of an AC brushless servo motor direct mounted to a gearbox 27 which is coupled to a head shaft 29 of the conveyor by a precision servo coupling 31 (low wind-up). The servo control electronics (not shown) accurately control the acceleration/deceleration rate of the motor 25. Because of the low inertia the motor 25 can be started, stopped and very accurately controlled to control the positioning of the conveyor. The drive and conveyor load are inertia matched as close as possible. In a specific embodiment the brushless servo drive motor 25 is a totally sealed unit chosen with the corrosive environment in mind and remains virtually maintenance free if properly dimensioned for the application. The drive motor 25 is also above any conveyed load to avoid the dripping contaminants.

In a manner of a typical conveyor assembly, a forward path 24 of the timing belt 12 lies directly below and parallel to a return path 26 thereof (best seen in FIG. 2). At intervals along a length of the belt 12, a series of pairs of cathode plate conveying assemblies 30 (in a specific embodiment a pair of conveying assemblies 30 are necessary to convey each cathode plate) are attached.

Figure 4:
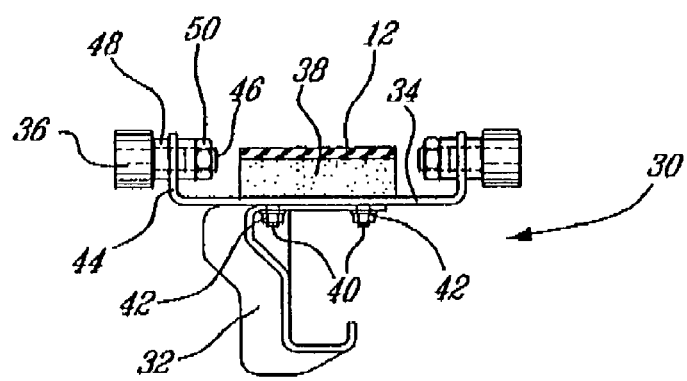
FIG. 4 is a detail view of a support hook.

Referring to FIG. 4, each cathode plate conveying assembly 30 is comprised of a hanger bracket 32, a bracket support plate 34 and two pairs of cam rollers 36 securely mounted on the bracket support plate 34. Additionally, a profile 38 is included to fasten the assembled hanger assembly to the timing belt 12. As is known in the art, the profile as in 38 can be applied to the timing belt including molding, thermal welding, bonding and machining. Alternatively the profile 38 may be attached using brass or stainless steel inserts (not shown) mounted directly on the timing belt 12.

The profile 38 includes two pairs of threaded shafts 40 which extend through corresponding holes machined in the hanger bracket 32 and bracket support plate 34. The hanger bracket 32 is securely mounted to the bracket support plate 34 by means of a pair of bolts 42 threaded onto the ends of the threaded shafts 40 and appropriately tightened. The hanger bracket 32 and bracket support plate 34 are manufactured from a strong resilient material such as stainless steel. The cam rollers 36 are attached to raised side edges 44 of the bracket support plate 34 by means of a cam roller axle 46. The cam roller axle 46 is attached at a first end to the cam roller 36 by a sealed bearing assembly (not shown) and the opposite end of the cam roller axle 46 is threaded. The axle 46 extends through a cam roller housing 48 and a bolt 50 is threaded onto the end of the axle 46 thereby securing it within the cam roller housing 48. The cam roller housing 48 is securely fastened to the raised side edges 44 by means of a weld.

Referring now back to FIG. 2 in addition to FIG. 4, the hanger assemblies 30 are mounted on the timing belt 12 in pairs and spaced appropriately such that the hanger brackets 32 of a pair of hanger assemblies 30 can be readily inserted into the spaced cut outs 52 in the cathode plates 17. On the forward path 24 as shown in FIG. 2 five (5) pairs of hanger assemblies 30 are used to transport up to five (6) cathode plates 17 at any one time. Typically, a first cathode plate 17a will be loaded onto the conveyor 10 at a first end 14 and a second cathode plate 17e offloaded from the conveyor 10 at a second end with the other cathode plates 17b, 17c and 17d being attended to at work stations (not shown) located in between the first end 14 and the second end 16 of the conveyor 10. It will be apparent to one of ordinary skill in the art that in order to load and unload the cathode plates as in 17 and perform operations at each station the cathode plates 17, and therefore the timing belt 12, must remain stationary during these times for a short period before moving on to the next station.

Figure 5:
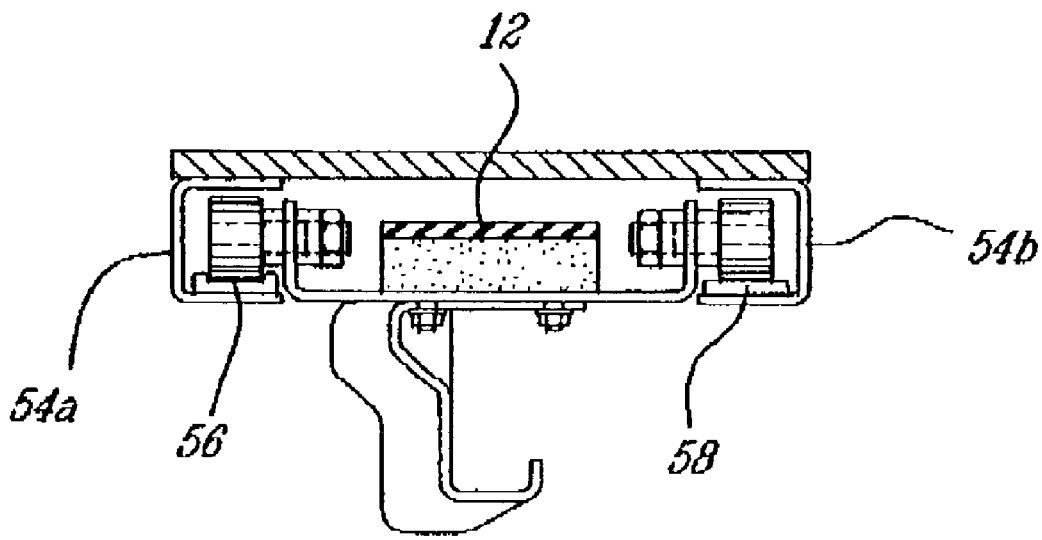
FIG. 5 is a detail view of the bottom track of FIG. 2 together with a support hook.
Figure 6:
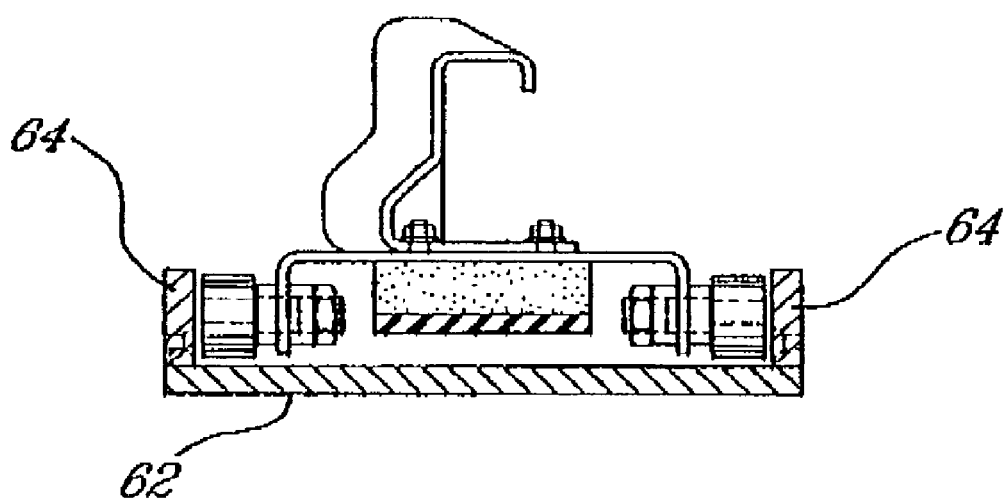
FIG. 6 is a detail of a top track of FIG. 2 together with a support hook.

FIGS. 5 and 6 detail the conveying assemblies 30 on the forward path 24 (FIG. 5) and on the return path 26 (FIG. 6) thereof respectively.

Referring to FIG. 5, along the forward path 24, i.e. on a bottom track of the timing belt 12, the cam rollers 36 of each hanger assembly 30 run in roller track guides as in 54.

The roller track guides 54 form part of the structural framework of the conveyor assembly 10 and are the main load carrying members for supporting the loading of cathodes 17. The roller track guides 54 are fabricated from u-shaped steel channel and function essentially as a guideway that provides a lower support running surface for the cam rollers 36 thereby maintaining the horizontal alignment of the belt 12 with respect to the conveyor assembly 10 structure and conveyor drive assembly 22. The weight of each cathode 17 mounted on the conveyor 10 is transferred therefore through the cam rollers 36 to a running surface provided by this roller support bracket 34. Proper alignment of the moving belt assembly is essential to reduce wear and provide high reliability.

As discussed above, the cam rollers 38 run on sealed bearings (not shown) and provide support for the suspended cathode plates 17. The use of low friction rolling bearing elements provides for efficient linear motion, with a minimum drag, of the suspended cathodes 17 and provides that there is no vertical loading placed on the timing belt 12 due to the weight of the cathode plates 17.

Additionally, in order to insure that the hanger assemblies 30 run true, a cam roller guide 56 is attached to the lower inside edge of one of the roller track guides 54a. In order to insure that the hanger assemblies 30 remain horizontal a similar cam roller supporting surface 58 is attached to the lower inside edge of the other roller track guide 54b. In order to improve efficiency by reducing drag cam roller guide 56 and cam roller supporting surface 58 can be fabricated from an Ultra High Molecular Weight (UHMW) polymer or similar self lubricating material.

As stated above, in order to support a cathode plate 17, each cathode hanger bracket 32 is inserted into a rectangular opening as in 52, a pair of which are cut in each cathode plate 17 immediately below the cathode hanger bar 60. The pairs of cathode hanger brackets 32 are arranged on the timing belt 12 such that cathode plates 17 moves in a direction that is perpendicular to a surface thereof.

When the timing belt 12 is being driven, the hook assemblies 30 move from left to right along the forward path 24 of the timing belt 12 with the cathode hanger brackets 32 extending downwards. At the end 16 of the forward path 24 the conveying assemblies 30 pass around the roller 20 and proceed along the return path 26 from right to left with the cathode hanger brackets 32 extending upward.

Referring now to FIG. 6, the top track 26 is essentially the same as the bottom track 24 with the load having been removed. The top track 26 mainly guides a return run of the belt 12 and the conveying assemblies 30. It is fabricated from base portion 62 and a pair of side walls as in 64 and has a generally U-shaped cross section.

People in the art will appreciate that the cathode plates are easily loaded and unloaded from a hanger bracket 32 from below by means of a loading or unloading mechanism (both not shown).

As stated above, the belt 12 is connected to the cathode hanger brackets 32 through profiles molded Into the belt at manufacture or bonded thereto using a suitable adhesive or well known thermal bonding techniques. It is to be noted that the timing belt 12 does not sustain a permanent stretch under load. Moreover, due to the cogged profile thereof, the timing belt 12 is less likely to slip on the conveyor drive. Finally, the belt assembly weight relative to the cathode conveyor load is very low and therefore offers a lower inertia load, which facilitates more accurate positioning at higher transfer speeds than in the prior art.

Fabrication of the timing belt 12 in a corrosion resistant material combined with the location of the timing belt 12 above points of loading and unloading aid in preventing corrosive attack from dripping contaminants, a main concern with equipment in such primary metal extracting industries. A number of recurrent problems are therefore solved with the conveyer assembly of the present invention, elimination in permanent chain stretch, more accurate positioning at high transfer speeds, less corrosion, reduced contamination problems and less wear than experienced with chain conveyors or mechanical walking beam structures conventionally utilized in the prior art, and easier position control by the conveyor drive because of reduced system inertia.

Persons of ordinary skill in the art will also appreciate the simpler service maintenance due to the reduction in moving parts, a reliable drive control for higher speed positioning ensured by reliable electric drives, such as brushless sealed servo drive motors and the possibility of varying the length of the endless belt conveyor for optional stripping station layouts.

The present conveyer assembly meets the requirements for high capacity stripping systems (above 500 per hour or unit cycle time of 7.2 seconds) that require the electrodes to be transferred 6 to 7 feet and accurately positioned at multiple stripping stations in 2.5 to 3 seconds, in such a manner that the stripping function is carried out at the working station during a dwell time of 3.5 to 4 seconds.

Although the present invention has been described hereinabove by way of specific embodiments thereof, it can be modified, without departing from the spirit and nature of the subject invention as defined in the appended claims.

What is claimed is:

1. A linear conveyer assembly for transporting cathode plates comprising:
   a belt having a surface substantially parallel to the ground;
   a series of cathode plate conveying assemblies attached at intervals to said belt and extending downwards, said series of cathode plate conveying assemblies being supported such that a travel thereof is limited to a direction parallel with said surface of the belt; and
   a motor for driving said belt;
   wherein said belt is located above the cathode plates being transported and wherein said belt is fabricated from a material comprising polyurethane.

2. The linear conveyer assembly according to claim 1, wherein each one of said series of conveying assemblies further comprises cam rollers attached thereto and running in a pair of channels.

3. The linear conveyer assembly according to claim 1, wherein said series of conveying assemblies are aligned so that the cathode plates move in a direction substantially perpendicular to a surface of the cathode plates.

4. The linear conveyer assembly according to claim 1, wherein said each one of said series of conveying assemblies comprises a roller support bracket supported by a support plate, roller track guides, cam rollers attached to a cathode hanger bar and a cathode hanger bracket directly supporting said cathode plate transferred through the cam rollers to a running surface provided by said roller support bracket.

5. The linear conveyer assembly according to claim 4, wherein said roller support bracket is a guideway providing a lower support running surface for the cam rollers, and maintaining horizontal alignment of the belt.

6. The linear conveyer assembly according to claim 4, wherein said cam rollers are bearing components supporting the suspended cathode plates, allowing an efficient linear motion with a minimum drag of the suspended cathodes plates at a low tension of the belt with no vertical load on the belt.

7. The linear conveyer assembly according to claim 4, wherein said cathode hanger bracket has at least one pair of cam rollers attached thereto to transfer the vertical cathode plate weight to the roller support bracket.

8. The linear conveyer assembly according to claim 4, wherein said cathode hanger bracket is selected in the group comprising a fabricated steel hook and a forged steel hook.

9. The linear conveyer assembly according to claim 4, wherein said cathode hanger bracket is inserted into a pair of rectangular openings cut in each of the cathode plates immediately below the cathode hanger bar.

10. The linear conveyer assembly according to claim 1, wherein each cathode plate conveying assembly comprises a pair of cathode hanger brackets mounted onto a cathode hanger bar from which extend two pairs of cam rollers adapted to fit into a channel that runs along either side of and parallel to a forward path of the belt.

11. The linear conveyer assembly according to claim 4, wherein said cathode plates are easily loaded and unloaded from the hanger bracket from below.

12. The linear conveyer assembly according to claim 4, wherein said belt is connected to the cathode hanger brackets through bolted inserts provided into the belt.

13. The linear conveyer assembly according to claim 1, wherein said belt is a timing belt having a cogged profile.

14. The linear conveyer assembly according to claim 1, wherein said belt is located above points of loading and unloading.

15. A linear conveyer assembly for transporting cathode plates comprising:
   a belt having a surface substantially parallel to the ground;
   a series of cathode plate conveying assemblies attached at intervals to said belt and extending downwards, said series of cathode plate conveying assemblies being supported such that a travel thereof is limited to a direction parallel with said surface of the belt; and
   a motor for driving said belt;
   wherein said belt is located above the cathode plates being transported and wherein said belt is fabricated from a stretch resistant pliable material.

16. The conveyor of claim 15, wherein said pliable material is corrosion resistant.

17. The conveyor of claim 15, wherein said pliable material comprises polyurethane.

18. The conveyor of claim 15, wherein said pliable material comprises a reinforcing material selected from the group consisting of Kevlar, steel, glass fibre, carbon and combinations thereof.

* * * * *